United States Patent [19]

De Dionigi

[11] 4,389,169

[45] Jun. 21, 1983

[54] PUMP FOR FLUIDS

[75] Inventor: Manlio M. De Dionigi, Olgiate Olona, Italy

[73] Assignee: Alessandro Nicoletti, Milan, Italy

[21] Appl. No.: 241,238

[22] Filed: Mar. 6, 1981

[30] Foreign Application Priority Data

Mar. 10, 1980 [IT] Italy ................................ 20461 A/80

[51] Int. Cl.³ .............................................. F04B 17/04
[52] U.S. Cl. ...................................... 417/417; 310/30
[58] Field of Search ...................... 417/416, 417, 418; 310/23, 24, 30, 34, 35

[56] References Cited

U.S. PATENT DOCUMENTS

| | | | |
|---|---|---|---|
| 754,681 | 3/1904 | Muller | 310/30 X |
| 2,383,382 | 8/1945 | Harding | 310/30 X |
| 2,686,280 | 8/1954 | Strong et al. | 310/30 X |
| 3,461,806 | 8/1969 | Barthalon | 417/418 |

FOREIGN PATENT DOCUMENTS 921617 3/1963 United Kingdom ................ 417/417

*Primary Examiner*—Leonard E. Smith
*Attorney, Agent, or Firm*—McAulay, Fields, Fisher, Goldstein & Nissen

[57] ABSTRACT

A reciprocating electromagnetic pump, particularly but not exclusively for non viscous fluids, adapted to considerably reduce hum and heat loss, at the same time decreasing the electrical input, wherein the trunk piston of magnetic material, subjected to the unidirectional electromagnetic force produced by an AC-fed coil enclosing said piston, consists of a set of coaxial overlapping liners instead of a single piece. The higher is the number of these overlapping liners and the more considerable is the effect, which may be further improved if they are covered with an insulating adhesive before assembly and the cylinder for the piston is also made of magnetic material instead of the conventional non magnetic material.

1 Claim, 4 Drawing Figures

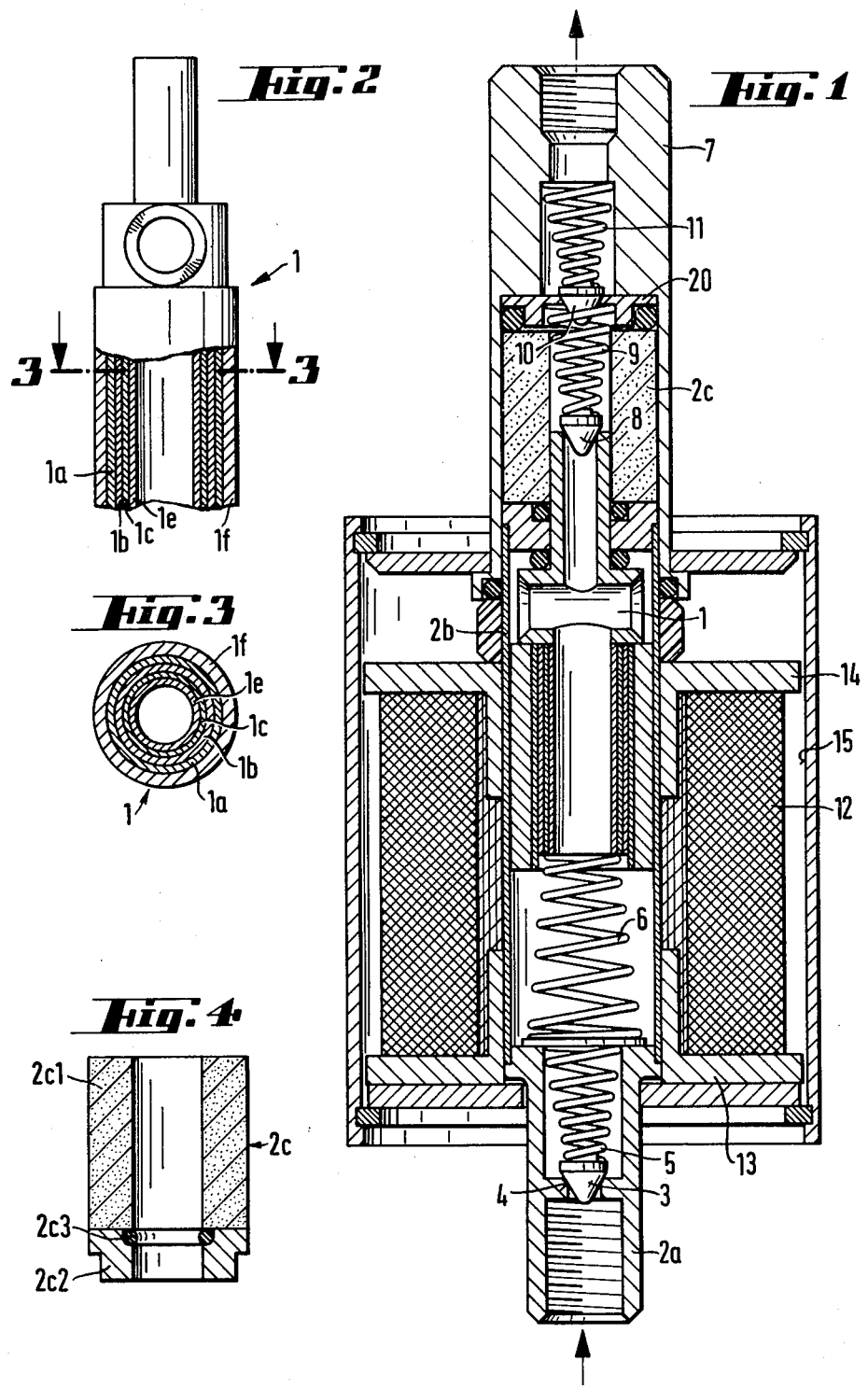

PUMP FOR FLUIDS

BACKGROUND OF THE INVENTION

The present invention relates to a reciprocating electromagnetic pump of the kind comprising a trunk piston of magnetic material so that the liquid to be delivered flows through it, said piston being reciprocable in a cylinder connected at its ends with the suction and delivery ducts and being enclosed in a coil energized during the piston suction stroke, during which a return spring is compressed, said spring driving back the piston during the delivery stroke when the energizing current is cut off, said energizing coil being AC fed, for instance through a diode so as to cause the current to flow only the direction in which the electromagnetic force generated between coil and piston, moves the latter in the suction direction.

The pumps of this kind generally have two valves at the delivery side, the one on the delivery duct and the other arranged on the piston head so as to close, in the positive pumping stage, its cavity and to cause it to pump the liquid which in the piston descent stage passed from the bottom part of the cylinder (suction side) to its top part (delivery side), as well as a suction valve which is closed in the piston descent stage and opens in the ascent stage, so as to fill with liquid the part of the cylinder emptied by the piston during its ascent stage.

In the known pumps of this kind, the cylinder in which the piston is reciprocated generally consists of several elements, that is a suction portion, a central portion in which the piston of magnetic material is being moved and a delivery portion into which goes the front part of the piston so as to cause compression and delivery of the liquid.

However this kind of pumps is very noisy, particularly when they are fixed to the structure of the machine on which they are operating, making an annoying hum together with likewise troublesome vibrations which one believes are caused by forces acting transversally to the direction of movement of said piston.

Moreover, because of the generation of the well known eddy currents, the pump has the tendency to get very warm so as to absorb an amount of electric power which is considerably higher than that required for the pump operation and is irreversibly transformed into heat.

Some manufacturer tried to find a remedy for the vibrations with particularly sophisticated and precise structures, which however solved only partially this problem, but left totally unsolved the hum and heating problem, so that the manufacturer are compelled to recommend not to use these pumps in a continuous way.

SUMMARY OF THE INVENTION

It has now been found that if the piston of these pumps is made with a set of cylindrical liners overlapping on each other, instead of being an internally bored single piece, hum is considerably reduced (practically halved), vibrations are practically removed, current input is reduced of 30–40% and a pump made according to the present invention does not get warm even if it is being operated continuously for hours.

BRIEF DESCRIPTION OF THE DRAWING

The present invention will be better understood with the aid of the following detailed description of a preferred embodiment given as a non limiting example, making reference to the accompanying drawing, in which:

FIG. 1 is a sectional view on an enlarged scale of a pump of the above mentioned kind, in rest condition;

FIG. 2 is a partially sectioned vertical view on an enlarged scale of a piston according to the present invention;

FIG. 3 is a horizontal sectional view on an enlarged scale of the piston, taken along line 3—3 of FIG. 2; and FIG. 4 is a vertical sectional view of a particular structure of the guide sleeve for the piston stem.

DETAILED DESCRIPTION OF THE PREFERRED EMBODIMENT

The pump according to the present invention comprises a piston 1 of magnetic material (forming the magnet core) sliding in a cylinder consisting of three portions 2a, 2b and 2c.

The portion 2a is the suction zone and contains suction valve 3 which is being urged against the seat 4 of spring 5.

This portion 2a is fixedly secured to portion 2b of the cylinder by adhesive or welding and may be made either of the same material of portion 2b or of other material such as copper, plastic material and so forth.

The portion 2b is the central zone of the cylinder and is generally made of brass or stainless steel and in the known structures always with antimagnetic materials, and contains in its lower part the spring 6 which during the extension stage has the function of supplying the required pumping force to the piston. The spring 6 abuts at one side on the upper base of portion 2a of the cylinder and at the other side on the base of piston 1.

The portion 2c is the delivery zone of the cylinder and the front part of the piston goes into it, causing the compression to take place.

The delivery body of the pump comprises the member 7 provided with the valves 8 and 10 urged against their seats by the springs 9 and 11. Seat of valve 8 is on the piston head and closes it during the delivery stroke (upwards) so as to push under pressure the liquid pumped through the valve 10 being its seat on an inserted ring 20 and opening under the thrust of the liquid pushed by the piston during the delivery stage, while it closes by means of spring 11 and the pressure existing in the delivery duct, during the suction stroke of the piston in order to prevent return into the pump of liquid contained in the delivery duct.

Between the various above described elements there are annular O-rings having the function of hydraulic seal between the several elements.

Furthermore, around the cylinder 2 there is the energization magnetic coil 12 provided with two flanges 13 and 14, the whole enclosed in the outer envelope 15, which contains and holds tight the various above described elements by known means which are not shown in the drawing.

With reference now to FIGS. 2 and 3 the pump piston, according to the present invention, instead of having made of a single piece as in the known structures, consists of a set of liners 1a, 1b, 1c, 1e, 1f overlapping on one another, of which the outer liner 1f has greater thickness for reasons of mechanical strength. The number of liners is the highest obtainable as a function of the piston diameter and workable thickness of said liners.

It has also been found that the results obtained with the piston structure according to the present invention, may be further improved when between the liners a layer of insulating material is inserted, this being obtained by making the outer diameter of each liner slightly less than the inner diameter of the next liner and inserting between them during the assembling operation an adhesive based on a resin with insulating power, such as polyester and/or preferably epoxy resins.

It has also been found that a further improvement of the results is obtained when also portion $2b$ of the liner is made of magnetic material.

With reference now to FIG. 4 showing on an enlarged scale the sleeve $2c$ being the upper portion of the pump cylinder, according to another aspect of the present invention, instead of being a single piece either of brass or of graphite with self-lubricating properties, it consists of three parts, a first part $2c1$ of graphite of greater length, a second part $2c2$ of brass and between said parts an O-ring $2c3$ of such a size as to form a seal between said parts $2c1$ and $2c2$, and moreover, slightly protruding inside the bore where slides the stem of piston 1, to be also a sealing and cleaning member for said piston stem, thus allowing to make the inner diameter of the sleeve $2c$ with a greater tolerance and therefore with less precision than that required for the known structures.

Although the invention has been shown and described with respect to an exemplary embodiment thereof, it should be understood by those skilled in the art that other changes, omissions and additions may be made therein and thereto, without departing from the spirit and the scope of the invention.

I claim:

1. A reciprocating electromagnetic pump comprising a trunk piston of magnetic material, reciprocable in a cylinder connected at its ends with suction and delivery ducts and enclosed in a coil energized during the piston suction stroke, wherein the piston comprises a set of cylindrical liners overlapping on one another, said cylinder comprising a suction portion, a central portion which receives said sliding piston, and a delivery portion, said central portion being fabricated from a magnetic material, the delivery portion of the cylinder comprising two parts, one of said parts being fabricated from graphite and the other of brass, with an O-ring arranged between them, said O-ring slightly protruding inside the cylinder bore portion which receives the sliding piston stem.

* * * * *